(12) United States Patent
Echtenacher et al.

(10) Patent No.: US 12,188,518 B2
(45) Date of Patent: Jan. 7, 2025

(54) BEARING ARRANGEMENT FOR THE MOUNTING OF A CONTAINER PROCESSING CAROUSEL WITH RESPECT TO A BASE FRAME OF A CONTAINER PROCESSING APPARATUS IN A BEVERAGE FILLING INSTALLATION

(71) Applicant: KRONES AG, Neutraubling (DE)

(72) Inventors: Albert Echtenacher, Neutraubling (DE); Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 147 days.

(21) Appl. No.: 18/060,493

(22) Filed: Nov. 30, 2022

(65) Prior Publication Data

US 2023/0167850 A1 Jun. 1, 2023

(30) Foreign Application Priority Data

Dec. 1, 2021 (DE) ..................... 10 2021 131 574.3

(51) Int. Cl.
*F16C 19/54* (2006.01)
*B67C 7/00* (2006.01)
*F16C 25/08* (2006.01)

(52) U.S. Cl.
CPC ............ *F16C 19/548* (2013.01); *B67C 7/004* (2013.01); *F16C 25/083* (2013.01)

(58) Field of Classification Search
CPC ......... F16C 25/06; F16C 25/08; F16C 25/083
See application file for complete search history.

(56) References Cited

U.S. PATENT DOCUMENTS 2,597,161 A 5/1952 Megel et al.
3,003,836 A * 10/1961 Hill ........................ F16C 25/083
384/620

(Continued)

FOREIGN PATENT DOCUMENTS

DE 499877 C 6/1930
DE 948319 8/1956

(Continued)

OTHER PUBLICATIONS

Extended European Search Report dated Mar. 30, 2023 from corresponding European application No. 22210909.2, 6 pages.

(Continued)

*Primary Examiner* — James Pilkington
(74) *Attorney, Agent, or Firm* — Haynes and Boone, LLP (57) ABSTRACT

A bearing arrangement for the mounting of a container processing carousel with respect to a base frame of a container processing apparatus in a beverage filling installation, comprising including a bearing shaft which extends along a longitudinal axis, a bearing cup which is rotatable relative to the bearing shaft, an adjusted bearing assembly, arranged between the bearing shaft and the bearing cup, for the mounting of the bearing cup with respect to the bearing shaft, and a ring-shaped preload unit for imparting a specified preload to the adjusted bearing assembly, wherein the ring-shaped preload unit includes a multiplicity of spring assemblies, which are distributed uniformly in a circumferential direction about the longitudinal axis, for applying the preload to the adjusted bearing assembly. A container processing apparatus including the bearing arrangement, and a method for preloading an adjusted bearing assembly of the bearing arrangement are described.

17 Claims, 7 Drawing Sheets

(56) References Cited

U.S. PATENT DOCUMENTS

| | | | | |
|---|---|---|---|---|
| 4,227,755 | A | * | 10/1980 | Lundberg ............ F04C 29/0021 384/101 |
| 4,913,564 | A | | 4/1990 | Stephan et al. |
| 9,863,469 | B2 | * | 1/2018 | Shimizu ................ F16C 33/586 |
| 2010/0281826 | A1 | | 11/2010 | Li et al. |

FOREIGN PATENT DOCUMENTS

| DE | 2844940 A1 | 5/1979 |
|---|---|---|
| DE | 19937040 A1 | 3/2001 |
| DE | 102012005529 A1 | 9/2013 |
| DE | 102020103266 A1 | 8/2021 |
| EP | 2330071 A2 | 6/2011 |
| JP | 08035521 A | 2/1996 |
| JP | 2016130532 A | 7/2016 |
| JP | 2006162011 A | 6/2022 |
| WO | WO 01/60536 A1 | 8/2001 |
| WO | WO-2010054640 A2 * | 5/2010 ............ F16C 19/163 |
| WO | WO 2016/114195 A1 | 7/2016 |

OTHER PUBLICATIONS

"Tightening of bolted connections of dimensions M12 to M36"; German Steel Construction Committee, Steel Construction Publishing and service GmbH; 20 pages. Listed as D reference in Search Report and mentioned in Paragraph [0053] of the Specification.
"Execution of steel structures and aluminum structures"; Part 2: Technical requirements for steel structures; DIN EN 1090-2, Sep. 2018, 214 pages. Listed as "D" reference in Search Report and mentioned in Paragraphs [0053] and [00105] of the Specification.
Search Report for German Application No. DE 10 2021 131 574.3 dtd Jun. 23, 2022; 8 pages.

* cited by examiner

BEARING ARRANGEMENT FOR THE MOUNTING OF A CONTAINER PROCESSING CAROUSEL WITH RESPECT TO A BASE FRAME OF A CONTAINER PROCESSING APPARATUS IN A BEVERAGE FILLING INSTALLATION

CROSS-REFERENCE TO RELATED APPLICATIONS

This application claims priority from German Patent Application No. DE 10 2021 131 574.3, filed on Dec. 1, 2021 in the German Patent and Trademark Office, the disclosure of which is incorporated herein by reference in its entirety.

BACKGROUND

Technical Field

The present invention relates to a bearing arrangement for the mounting of a container processing carousel with respect to a base frame of a container processing apparatus in a beverage filling installation, to a method for preloading an adjusted bearing assembly of a bearing arrangement for the mounting of a container processing carousel with respect to a base frame of a container processing apparatus in a beverage filling installation, and to a container processing apparatus for use in a beverage filling installation.

Related Art

In the context of filling installations for filling containers with a product, for example a beverage, and subsequently sealing the filled container with a container seal, it is known that at least some of the container processing apparatuses of the filling installation, in particular a filler for filling containers with the product and a sealer for sealing the filled containers with a container seal, are of rotary construction.

In the case of processing apparatuses of rotary construction, an upper part that is rotatable about a central axis, also referred to as carousel, is mounted rotatably on a lower part, also referred to as base frame. The axis of rotation is normally oriented vertically, and consequently substantially in the direction of gravitational force.

The bearing assembly of the upper part on the lower part generally comprises two rolling bearings which are arranged with a specified spacing to one another as viewed in the direction of the axis of rotation and concentrically with respect to the axis of rotation. As is known per se, each of the rolling bearings has an inner ring and an outer ring and a multiplicity of rolling elements arranged between the inner ring and the outer ring.

The rolling bearings are provided between a bearing shaft, which extends in a longitudinal (central) axis that corresponds to the axis of rotation, and a bearing cup, which is arranged radially outside the bearing shaft in relation to the longitudinal axis and concentrically with respect thereto. Here, the inner rings of the rolling bearings are in contact with the bearing shaft in a manner known per se, whereas the outer ring is in contact with the bearing cup.

To form the bearing assembly, various types of bearing arrangement, or various bearing assembly concepts, are known. For example, it is known for the bearing assembly to be configured as a floating bearing assembly, in the case of which a play of generally a few tenths of a millimetre is provided between the rolling bearings in an axial direction.

Floating bearing assemblies are normally inexpensive, but are disadvantageous with regard to processing apparatuses in filling installations because, in the case of such a bearing assembly, the upper part tends to exhibit oscillations or vibrations during operation.

A further concept is the fixed-floating bearing assembly in the case of which, on one side, a fixed bearing for accommodating axial and radial forces and, on the other side, a floating bearing for accommodating only radial forces are provided. The fixed-floating bearing assembly is suitable in particular for compensating for manufacturing tolerances or in the case of different warming of bearing shaft and bearing cup during operation. A disadvantage in the case of all bearing types that involve play is the absence of defined bearing loads.

An embodiment of the bearing assembly that is particularly expedient with regard to the avoidance of oscillations or vibrations of the upper part is the adjusted bearing assembly. An adjusted bearing assembly generally comprises two angular contact bearings in a mirror-symmetrical arrangement. Here, the inner rings or the outer rings of the rolling bearings are moved relative to one another until a specified preload is attained. The adjustment of a bearing assembly is to be understood to mean the defined bracing of the two bearings with respect to one another. Adjusted bearing assemblies are distinguished with regard to the situation of the pressure lines of the rolling bearings, wherein the pressure lines of a rolling bearing constructed as an angular contact bearing form a cone and coincide on the central bearing shaft at a point, the so-called pressure cone tip. If the pressure cone tips of both rolling bearings are situated between, or within, the positions of the rolling bearings in the direction of the longitudinal axis, that is to say if the pressure current tips point inwards, this is referred to as an X arrangement. Correspondingly, the pressure cone tips point outwards in the case of an O arrangement.

In the case of adjusted bearing assemblies, it is of crucial importance to set the specified preload between the rolling bearings in a particularly exact manner. In the case of too high a preload, excessive friction in the rolling bearings can lead to excessive wear, and the free movement of the rotation of bearing cup and bearing shaft relative to one another can be impaired. In the case of too low a preload, disadvantages can arise analogously to those in the case of a bearing assembly involving play.

The adjustment can be achieved by virtue of a nut being screwed onto the bearing shaft or into the bearing cup, which nut exerts a force in an axial direction on the respective bearing ring. Here, in order to ascertain the correct preload, it is necessary to detect the tightening moment of the nut during the screwing-on process, or a distance covered by the nut in an axial direction must be measured, often in relation to an initial point of contact of the nut with the bearing ring, because both can be converted as a measure for the preload. This involves great effort. Furthermore, the measurement can be falsified for example owing to the influence of lubricants or owing to settling behaviour in the bearings.

A further variant for imparting the preload to the rolling bearings is a ring-shaped preload element which is arranged in a preloaded state between an element fastened to the bearing shaft or to the bearing cup, or a shoulder provided on the latter element, and the corresponding bearing ring, and which thus exerts a spring force on the bearing ring in an axial direction. It is known for a spring washer, which is arranged concentrically with respect to the longitudinal (central) axis, to be used as a preload element. A spring washer constitutes a central disc spring that is threaded onto the bearing shaft or pushed into the bearing cup.

As an alternative to this, it is known for a single-layer or multi-layer flat wire wave spring, also referred to as a "Smalley", to be used instead of the central disc spring. Smalleys are relatively expensive and furthermore, like disc springs, albeit to a somewhat lesser degree, harbour the risk that they can lose their bracing force entirely if, for example owing to human error by the technician during the assembly process, or owing to an unforeseen shock during operation, they are pushed into a block state. Since the bearing shaft normally has a relatively large outer diameter, the inner diameters of disc springs or of Smalleys must likewise be correspondingly large because these must, as described above, be pushed onto the bearing shaft. Furthermore, in the case of disc springs and in particular wave springs with a large inner diameter, it is difficult to achieve that the axial force provided by the spring is distributed uniformly in a circumferential direction in relation to the longitudinal axis.

Adjusted bearing assemblies have in common the fact that their maintenance and overhaul is relatively complex and involves relatively great effort.

A bearing arrangement with a concentrically arranged spring washer based on a disc spring pair that is pushed in the direction of the bearing assembly by means of a bracing nut is known for example from DE 948 319 C.

SUMMARY

An improved bearing arrangement for the mounting of a container processing carousel with respect to a base frame of a container processing apparatus in a beverage filling installation, an improved container processing apparatus, and a corresponding method are described herein according to various embodiments.

Correspondingly, a bearing arrangement for the mounting of a container processing carousel with respect to a base frame of a container processing apparatus in a beverage filling installation is proposed, comprising a bearing shaft which extends along a longitudinal axis, a bearing cup which is rotatable relative to the bearing shaft, an adjusted bearing assembly, arranged between the bearing shaft and the bearing cup, for the mounting of the bearing cup with respect to the bearing shaft, and a ring-shaped preload unit for imparting a specified preload to the adjusted bearing assembly.

The bearing arrangement is characterized in that the ring-shaped preload unit comprises a multiplicity of spring assemblies, which are distributed uniformly in a circumferential direction about the longitudinal axis, for applying the preload to the adjusted bearing assembly.

By virtue of the fact that the ring-shaped preload unit comprises a multiplicity of spring assemblies, which are distributed uniformly in a circumferential direction about the longitudinal axis, for applying the preload to the adjusted bearing assembly, precise setting of the preload on the bearing assembly can be achieved in a simple manner. Furthermore, the force acting in the direction of the bearing assembly can be provided particularly uniformly over the circumference of the preload unit or of the bearing assembly.

Furthermore, the calculated bearing preload that is to be provided can be relatively easily translated into the spring assemblies. Through the provision of a multiplicity of spring assemblies, the force provided by these can be easily scaled, in some embodiments by varying a number of spring assemblies.

The preload is oriented in the direction of the longitudinal axis or acts in the direction of the longitudinal axis in order to thus provide the adjustment of the bearing assembly and the direction of the longitudinal axis.

In order, for example, to save weight with regard to the bearing assembly, the bearing shaft may be of tubular form. If the bearing shaft is connected to the rotating upper part, or if the bearing shaft is fixed to the upper part, then it is furthermore possible, owing to the low mass in relation to a solid shaft, to achieve reduced expenditure of energy for the rotation of the upper part.

Depending on the arrangement of the bearings of the adjusted bearing assembly to form the latter, the preload unit may either be arranged on the bearing shaft or arranged on the bearing cup.

According to a further embodiment, at least one spring assembly comprises a spiral spring, a wave spring and/or a disc spring, wherein, in one embodiment, at least one spring assembly comprises a multi-layer wave spring and/or a multiplicity of disc springs stacked one on top of the other in the direction of a direction of action of the spring assembly.

The direction of action of the spring assembly is oriented parallel to the longitudinal axis, and consequently in an axial direction in relation to the bearing arrangement. In an exemplary embodiment with a multiplicity of disc springs arranged in a direction of action, that is to say an axial direction, at least two, and in certain embodiments all, adjacent disc springs to be arranged in each case mirror-symmetrically with respect to one another. In other words, the disc springs are in various embodiments in an alternately oriented arrangement. If the disc springs are in an alternately oriented arrangement, it is possible to achieve an addition of the spring travels of each of the disc springs whilst maintaining a constant force. Alternatively or in addition, it is also possible for at least two, and in several embodiments all, adjacent disc springs to be in an identically oriented arrangement. In the case of an identically oriented arrangement, the spring forces of the adjacent disc springs in an identically oriented arrangement are added together, whilst maintaining substantially the same spring travel. Through the possibility of layering, that is to say the combination of identically oriented and oppositely oriented arrangements, a wide variety of different spring characteristic curves can be implemented. Thus, by means of the configuration and number of the spring assemblies, the preload provided by the preload unit can be set particularly exactly to the calculated, theoretically required preload.

In one refinement, disc springs of different thickness may be arranged in a suitable manner, that is to say in an oppositely oriented arrangement, identically oriented arrangement and/or a combination of oppositely oriented and identically oriented arrangements. In this way, it is even possible to implement progressive spring characteristic curves. For this purpose, use may in one or more embodiments be made of multiple disc springs of different material thickness and/or with different materials, identical disc springs with intermediate rings of different thickness, and/or different forms of layering.

According to a further embodiment, the preload unit comprises a nut element with a threaded portion which engages with a correspondingly shaped threaded portion on the bearing shaft or the bearing, and comprises a bracing ring for transmitting the preload, which is provided via the spring assemblies, to a bearing ring of the adjusted bearing assembly, wherein the spring assemblies are arranged between the nut element and the bracing ring. In this way, on the one hand, the nut element can be arranged precisely on the bearing shaft or the bearing cup, and furthermore, the spring force provided by the spring assemblies can be transmitted particularly uniformly via the bracing ring to the corresponding bearing ring. Furthermore, the spring force and consequently the preload can be further adapted by rotating the nut.

The complexity of the bearing cup or bearing shaft, and consequently the manufacturing costs of the bearing arrangement and consequently of a container processing apparatus that has the bearing arrangement, can be particularly low if a thread provision part is, in order to provide the threaded portion on the bearing shaft or in order to provide the threaded portion on the bearing cup, fixed to the bearing shaft or to the bearing cup respectively, self-evidently in a manner dependent on whether the nut element is configured to interact with a threaded portion on the bearing cup or on the bearing shaft. In several embodiments, the thread provision part is fixed in some embodiments to an end side, or to a flange or radial shoulder extending in a radial direction, of the bearing shaft or to an end side, or to a flange or radial shoulder extending in a radial direction, of the bearing cup.

If the nut element of the preload unit is configured to engage by way of its threaded portion with a threaded portion on the bearing shaft, then the thread provision part is correspondingly configured to provide the threaded portion on the bearing shaft. If, however, the nut element of the preload unit is configured to engage by way of its threaded portion with a threaded portion on the bearing cup, then the thread provision part is logically configured to provide the threaded portion on the bearing cup.

In order to reliably position the spring assemblies in the preload unit, the nut element and/or the bracing ring may have a multiplicity of cutouts configured for receiving a spring assembly, wherein, in certain embodiments, in each case one cutout is provided for receiving one of the spring assemblies. In other words, the nut element and/or the bracing ring in some embodiments comprise a number of cutouts which corresponds to the number of spring elements distributed in a circumferential direction. In each case one cutout may then be assigned to in each case one spring assembly.

The cutouts in several embodiments have a depth greater than a block length of the received spring assembly that the spring assembly exhibits in a fully compressed state, or in other words when it has been "compressed into a block state". The depth in some embodiments corresponds to the block length plus a specified residual length, that is to say to a specified minimum length of the spring element. It is thus possible to prevent the spring assemblies from being excessively compressed and thus possibly no longer being able to provide the spring force required for the preloading or the adjustment of the bearing assembly. Furthermore, the depth of the cutout is in one embodiment dimensioned to be smaller than a zero length of the spring assembly that the latter exhibits in an unloaded state, also referred to as the nominal length of the unloaded spring.

In one or more embodiments, the depth of the cutout corresponds to the difference between the zero length of the spring assembly that the latter exhibits in an unloaded state and a specified preload travel of the spring assembly, wherein the spring assembly, when compressed by the specified preload travel, provides the spring force that is to be provided by the respective spring assembly as its contribution to the provision of the required preload. In other words, the depth in various embodiments corresponds to a nominal length of the spring associated with the specified spring force. Accordingly, the preload of the adjusted bearing assembly can be set particularly easily to the required preload, specifically merely by virtue of the nut element and the bracing ring being installed in contact with one another.

According to a further embodiment, at least one positioning element, for example a dowel pin, is arranged between the nut element and the bracing ring in order to position the nut element and the bracing ring relative to one another in a circumferential direction and in a radial direction and/or in order to guide the bracing ring in the direction of the longitudinal axis relative to the nut element, wherein, in certain embodiments, a multiplicity of positioning elements is provided, wherein, in several embodiments, in each case one positioning element is assigned to in each case one spring assembly, wherein, in one or more embodiments, at least one positioning element is, in relation to a central axis of a spring assembly, arranged centrally with respect to the central axis, wherein the spring assembly surrounds the positioning element in some embodiments in a circumferential direction in relation to the central axis, wherein, in one embodiment, the positioning element is alternatively or additionally configured to provisionally position and/or position the spring assembly assigned thereto in the direction of the longitudinal axis.

The at least one positioning element may consequently serve, inter alia, for the purposes of providing positioning, for example centring, of nut element and bracing ring with respect to one another, and alternatively or additionally positioning of at least one spring assembly or of parts of the spring assembly, in one embodiment of at least one spring, for example of a disc spring or of a wave spring, of the spring assembly with respect to the nut element and/or with respect to the bracing ring.

The preload unit may in certain embodiments comprise at least one fixing element for fixing the nut element and the clamping ring with respect to one another, wherein, in some embodiments, in a specified fixed state, an axial side, facing towards the adjusted bearing assembly, of the nut element is in contact with an axial side, facing away from the adjusted bearing assembly, of the bracing ring. In other words, the nut element and the bracing ring are, in the specified fixed state, arranged without a gap to one another in the direction of the longitudinal axis.

The term "axial side" is in relation to the longitudinal axis; the axial sides are consequently end sides in relation to the longitudinal axis.

In an embodiment, the threaded portion of the nut element is configured as an internal thread and engages with a threaded portion of the bearing shaft, which is formed on the bearing shaft as an external thread, wherein, in certain embodiments, the adjusted bearing assembly has an O arrangement, wherein, in one or more embodiments, the preload unit applies the preload provided by means of the spring assemblies to an inner ring of the adjusted bearing assembly, for example via the bracing ring.

In a further embodiment, the threaded portion of the nut element is configured as an external thread and engages with a threaded portion of the bearing cup, which is formed on the bearing cup as an internal thread, wherein, in some embodiments, the adjusted bearing assembly has an X arrangement, wherein, in several embodiments, the preload unit applies the preload provided by means of the spring assemblies to an outer ring of the adjusted bearing assembly, for example via the bracing ring.

In order to prevent the preload unit, for example the nut element, from being undesirably adjusted relative to the component to which it is attached, or with which it engages, after the specified preload has been set, for example during operation, the preload unit may comprise at least one securing element for securing the preload unit relative to the bearing shaft, if the preload unit engages with the bearing shaft, or the bearing cup, if the preload unit engages with the bearing cup, in some embodiments for securing the nut element against rotation about the longitudinal axis relative to the bearing shaft or relative to the bearing cup. The securing element is in certain embodiments configured in the form of a securing plate. The securing element may furthermore be fixable to the bearing shaft or to the bearing cup, wherein, in some embodiments, the fixing of the securing element causes the preload unit, for example the nut element of the preload unit, to be secured against rotation.

Here, the securing element is configured to secure the preload unit against rotation relative to the bearing shaft if the preload unit is arranged on the bearing shaft, and the securing element is correspondingly configured to secure the preload unit against rotation relative to the bearing cup if the preload unit is arranged on the bearing cup.

In a further embodiment, the adjusted bearing assembly comprises two rolling bearings which are arranged with a specified spacing to one another as viewed along the longitudinal axis, wherein, in several embodiments, each rolling bearing comprises an inner ring and an outer ring and a multiplicity of rolling elements arranged between the inner ring and the outer ring, wherein, in one embodiment, at least one rolling bearing is configured as a ball bearing, roller bearing, in some embodiments cylindrical-roller bearing or tapered-roller bearing, wherein, in an embodiment, at least one rolling bearing, in various embodiments all rolling bearings, are configured as angular contact bearings.

In some embodiments, a rotary ring for a radial seal, for example a dynamic radial seal, for example a radial sealing ring, is arranged, as viewed in the direction of the longitudinal axis, between the preload unit and that bearing of the adjusted bearing assembly which faces towards the preload unit, wherein the rotary ring is configured to transmit pressure forces in the direction of the longitudinal axis. The rotary ring in several embodiments comprises a metal alloy, particularly preferably a steel alloy.

Correspondingly, a container processing apparatus for a beverage filling installation is proposed, comprising a base frame and a container processing carousel that is rotatable about a central axis of rotation relative to the base frame.

The container processing apparatus furthermore comprises a bearing arrangement according to any one of the embodiments above, which bearing arrangement is arranged between the base frame and the container processing carousel for the purposes of mounting of the container processing carousel on the base frame.

By virtue of the fact that the container processing apparatus furthermore comprises a bearing arrangement according to any one of the preceding embodiments, the advantages and effects described with regard to the bearing arrangement can analogously also be achieved by means of the container processing apparatus.

The bearing shaft is in certain embodiments fastened to the base frame, and the bearing cup is in some embodiments fastened to the container processing carousel. Alternatively, it is also possible for the bearing shaft to be connected to the container processing carousel and for the bearing cup to be connected to the base frame.

Correspondingly, a method for preloading an adjusted bearing assembly of a bearing arrangement for the mounting of a container processing carousel with respect to a base frame of a container processing apparatus in a beverage filling installation according to any one of the preceding embodiments is proposed, comprising fixing the preload unit, for example the nut element and the bracing ring of the preload unit with respect to one another, in a specified fixed state, applying the preload unit to the bearing shaft or the bearing cup such that the preload unit is in contact with a bearing ring of the adjusted bearing assembly in the direction of the longitudinal axis; securing the position of the preload unit on the bearing shaft or the bearing cup respectively; and releasing the fixed state.

The advantages and effects described with regard to the bearing arrangement and the container processing apparatus can analogously also be achieved by means of the method.

According to a further embodiment, the application of the preload unit comprises screwing the preload unit onto the bearing shaft or onto the bearing cup, wherein, in one embodiment, the securing of the position of the preload unit comprises securing of the screwed-on preload unit against rotation relative to the bearing shaft, if the preload unit has been screwed onto the bearing shaft, or relative to the bearing cup, if the preload unit has been screwed onto the bearing cup.

In some embodiments, the application of the preload unit to the bearing shaft or the bearing cup such that the preload unit is in contact with a bearing ring of the adjusted bearing assembly in the direction of the longitudinal axis comprises firstly tightening the preload unit until the bearings of the adjusted bearing assembly are in a play-free and in various embodiments braced state, and the bearing assembly is consequently in an adjusted state, furthermore comprises subsequently releasing the bracing action, that is to say loosening the in one embodiment braced preload unit, and thereupon retightening the preload unit in order to thereby set the specified preload on the adjusted bearing assembly.

If the preload unit comprises a nut element and a bracing ring, then it is in various embodiments the case, at least in the abovementioned final step of retightening the preload unit in order to set the specified preload on the adjusted bearing assembly, that the preload unit is at least initially in the specified fixed state in which, as described above, that axial side of the nut element which faces towards the adjusted bearing assembly is in contact with an axial side, which faces away from the adjusted bearing assembly, of the bracing ring.

The abovementioned step of retightening the preload unit in order to set the specified preload on the adjusted bearing assembly furthermore in some embodiments comprises, in one embodiment after the step of releasing the bracing action, tightening the nut element, which is in the fixed state, relative to the bearing shaft or relative to the bearing cup respectively until the bracing ring is in play-free contact with the bearing ring, which is to be braced, of the adjusted bearing assembly. Here, the nut element is in some embodiments tightened with a specified tightening moment, in one embodiment is tightened so as to be hand-tight. The step of retightening the preload unit in order to set the specified preload on the adjusted bearing assembly in certain embodiments furthermore comprises subsequently releasing the fixed state, in certain embodiments by releasing the at least one fixing element for fixing the nut element and the bracing ring with respect to one another in the specified fixed state.

Here, "hand-tight" is to be understood in particular to mean "hand-tight" within the meaning of the standard EN 1090-2 or of the DASt [German Committee for Steel Construction] directive 024 of 2018, ISBN 978-3-941687-35-6, or analogously thereto.

BRIEF DESCRIPTION OF THE FIGURES

Further embodiments of the invention will be discussed in more detail by way of the following description of the figures.

DETAILED DESCRIPTION

Exemplary embodiments will be described below on the basis of the figures. Here, elements which are identical or similar or of identical action are denoted in the various figures by identical reference designations, and a repeated description of these elements will, in part, be omitted in order to avoid redundancies.

Figure 1:
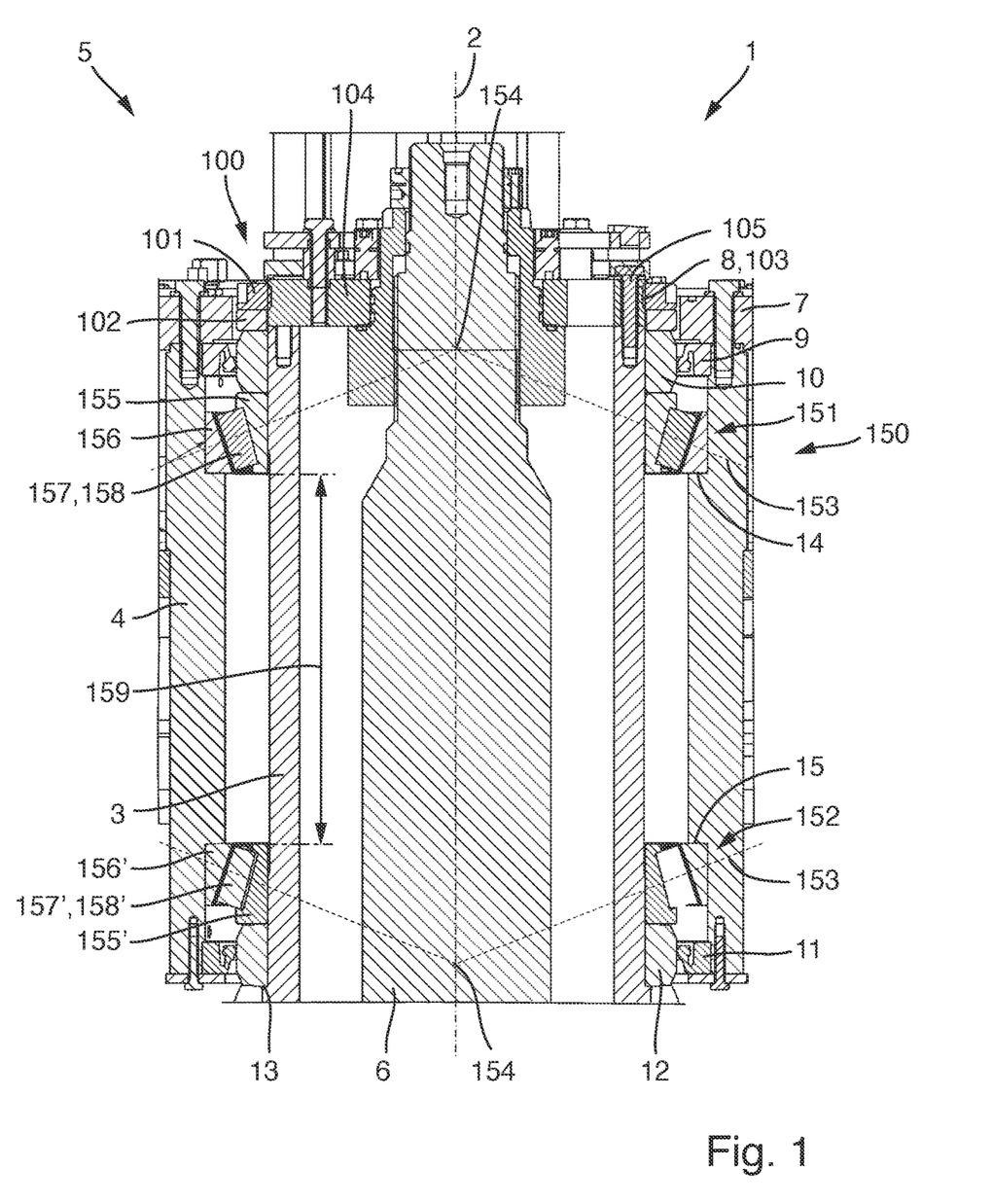
FIG. 1 schematically shows a sectional view through a container processing apparatus in a beverage filling installation.

FIG. 1 schematically shows a sectional view through a container processing apparatus 5 in a beverage filling installation, configured in the present case as a sealer for sealing containers with a container seal. The container processing apparatus 5 comprises a base frame 6 and a container processing carousel 7 which is rotatable relative to the base frame 6 about a central axis of rotation that corresponds to a longitudinal axis 2 described in more detail below. In order to implement the rotatability of the container processing carousel 7 relative to the base frame 6, the container processing carousel 7 is mounted so as to be rotatable relative to the base frame 6 by means of a bearing arrangement 1.

The bearing arrangement 1 comprises a bearing shaft 3, which extends along the longitudinal axis 2, and a bearing cup 4, which is rotatable relative to the bearing shaft 3. An adjusted bearing assembly 150 for the mounting of the bearing cup 4 with respect to the bearing shaft 3 is arranged between the bearing shaft 3 and the bearing cup 4. In the present case, the container processing carousel 7 is connected to the bearing cup 4. Furthermore, the base frame 6 is connected to the bearing shaft 3. The bearing shaft 3 is configured in the present case as a hollow shaft, that is to say so as to be tubular.

In order to apply a specified preload to the bearing assembly 150 in the direction of the longitudinal axis 2, that is to say in order to provide or establish the adjustment of the bearing assembly 150, the bearing arrangement 1 furthermore comprises a ring-shaped preload unit 100.

The adjusted bearing assembly 150 comprises two rolling bearings 151, 152 which are spaced apart from one another with a specified spacing 159 in the direction of the longitudinal axis 2 and which, in the present case, are each configured as angular contact bearings, in this embodiment in the form of tapered-roller bearings. Each rolling bearing 151, 152 comprises an inner ring 155, an outer ring 156, and a cage 158 which is arranged between the rings 155, 156 and which, in a circumferential direction in relation to the longitudinal axis 2, comprises a multiplicity of uniformly distributed rolling elements 157, which in the present case are of tapered configuration.

The adjusted bearing assembly 150 is sealed off to the outside, in the present case by virtue of in each case one seal being provided outside the two rolling bearings 151, 152 as viewed in the direction of the longitudinal axis 2, which seals are each formed from a rotary ring 10, 12 arranged on the bearing shaft 3 and a radial sealing ring 9, 11 arranged on the bearing cup 4. It is thus possible to prevent the rolling bearings 151, 152 from being damaged owing to contaminants.

Accordingly, the inner ring 155' of the second rolling bearing 152 is in contact with the stop 13 not directly but via the rotary ring 12, which is configured to be rigid in compression. Analogously to this, the inner ring 155 of the first rolling bearing 151 is in contact with the preload unit 100 not directly but via the rotary ring 10, which is configured to be rigid in compression.

Here, the expression "in contact" is to be understood to mean that there is no play, in particular no play in the direction of the longitudinal axis 2, between the components that are "in contact". Here, further parts, for example the above-described rotary ring 10, 12, may be arranged between the components, wherein the components and the further parts are then in each case present without play with respect to one another, that is to say are in each case touching. In other words, the expression "in contact" encompasses not only direct touching but likewise indirect touching or indirect contact.

The adjustment of a bearing assembly is to be understood to mean the defined bracing of the two bearings 151, 152 with respect to one another. In order to achieve the specified preload or the adjustment of the bearing assembly 150, it is the case in this embodiment that the inner rings 155, 155' of the two rolling bearings 151, 152 are pushed towards one another until the specified preload is achieved. In this embodiment, this is achieved by virtue of the inner ring 155' of the second rolling bearing 152 illustrated at the bottom in FIG. 1 abutting in in the direction of the longitudinal axis 2 against a radial shoulder 13, and the inner ring 155 of the first rolling bearing 151 illustrated at the top in FIG. 1 being pushed by the preload unit 100 in the direction of the second rolling bearing 152, as will be described in more detail with regard to the following figures.

Since the rolling bearings 151, 152 are configured as angular contact bearings, their pressure lines 153 each form a cone and coincide in each case at a pressure cone tip 154. The adjusted bearing assembly 150 is in the present case configured in an O arrangement, that is to say the pressure cone tips 154 point outwards in relation to the two rolling bearings 151, 152.

The force flow runs within the bearing arrangement 1 from the bearing shaft 3 via the preload unit 100 into the inner ring 155 of the first rolling bearing 151, onward via the rolling elements 157 thereof to the outer ring 156, which in turn is supported in the direction of the longitudinal axis 2 on a radial shoulder 14 of the bearing cup 4, onward through this, via the bearing cup 4, in the direction of the second bearing 52, onward via a further shoulder 15 of the bearing cup 4 to the outer ring 156', onward via rolling bearings 157' into the inner ring 155', and, via the rotary ring 12, to the shoulder 13 and thus back into the bearing shaft 3.

For the introduction of force into the inner ring 155, the preload unit 100 presses against the inner ring 155, in the present case via the interposed rotary ring 10, as already described above. In this embodiment, the preload unit 100 is for this purpose supported by way of a nut element 101 on the bearing shaft 3 and, by way of an optional bracing ring 102, which in relation to the nut element 101 is provided at the side of the bearing assembly 150, presses—via the interposed rotary ring 10—against the inner ring 155.

In order to provide or apply the preload to the adjusted bearing assembly, the ring-shaped preload unit 100 furthermore comprises a multiplicity of spring assemblies (not shown here) that are distributed uniformly in a circumferential direction about the longitudinal axis 2.

In order to be supported on the bearing shaft 3, the nut element 101 comprises a threaded portion 103 which is configured as an internal thread and which engages with a correspondingly shaped threaded portion 8, provided in the form of an external thread, on the bearing shaft 3.

The spring assemblies, which are not visible in this view, are in this embodiment arranged between the nut element 101 and the bracing ring 102. The bracing ring may alternatively also be omitted. Then, the spring assemblies are in various embodiments directly in contact with the corresponding bearing ring, in this case the inner ring 155, wherein—as described above—further components that are not part of the preload unit 100, such as the rotary ring 10, may be arranged between the spring assemblies and the inner ring 155 and thus provide indirect contact, which is likewise to be understood as contact within the meaning of this document.

For the provision of the threaded portion 8 on the bearing shaft 3, a thread provision part 104, in the present case in the form of a bracing disc, is fixed to the bearing shaft 2. For this purpose, the thread provision part 104 is fixed to an end side of the bearing shaft 3 by means of a multiplicity of screws 105.

Figure 2:
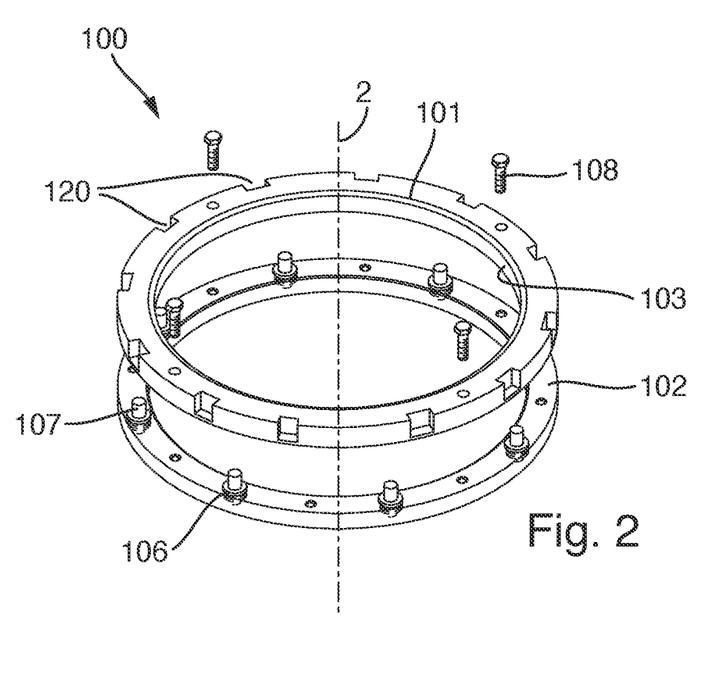
FIG. 2 schematically shows, in a perspective side view, an exploded illustration of a preload unit from FIG. 1.
Figure 3:
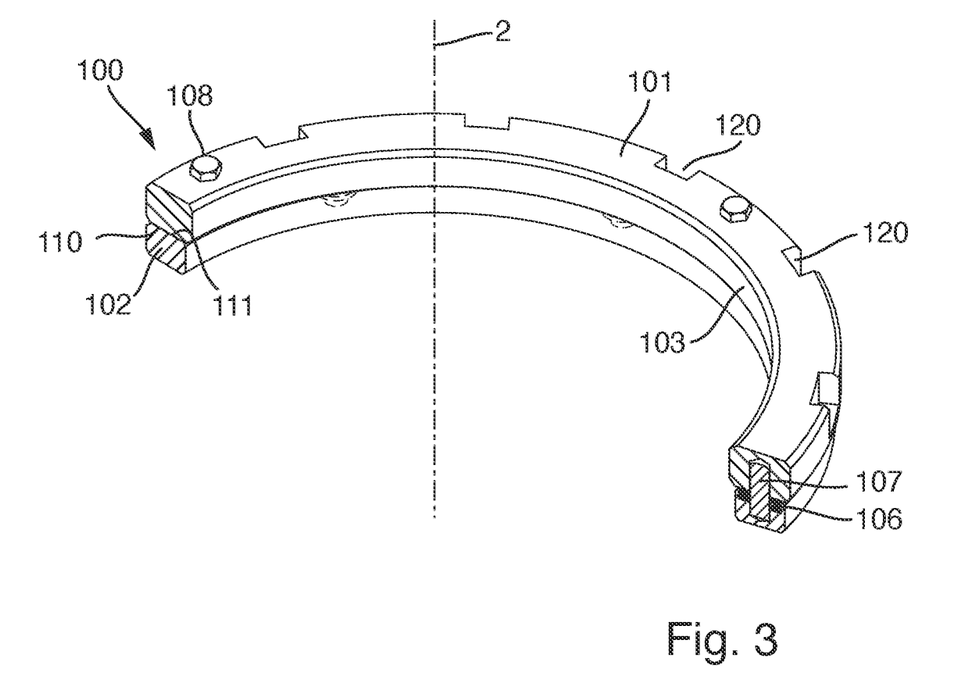
FIG. 3 schematically shows a perspective sectional view of a preload unit from FIG. 1.

FIG. 2 schematically shows, in a perspective side view, an exploded illustration of the preload unit 100 from FIG. 1, and FIG. 3 schematically shows a perspective sectional view of the preload unit 100 from FIG. 1.

FIG. 2 shows the spring assemblies 106 distributed uniformly in a circumferential direction about the longitudinal axis 2.

As can also be seen from FIGS. 2 and 3, the preload unit 100 comprises a multiplicity of positioning elements which are configured in the form of dowel pins 107 and which are arranged between the nut element 101 and the bracing ring 102 and which centre the nut element 101 and the bracing ring 102 relative to one another. Each positioning element is assigned in each case one spring assembly 106 and likewise functions so as to position the spring assembly 106. The bracing ring 102 is guided axially relative to the nut element 101 in the direction of the longitudinal axis 2 by the dowel pins.

The preload unit 100 furthermore comprises a multiplicity of fixing elements which are configured in the form of screws 108 and which serve for fixing the nut element 101 and the bracing ring 102 with respect to one another in a specified fixed state, in which an axial side 110, which faces towards the adjusted bearing assembly 150 (see FIG. 1), of the nut element 101 is in direct contact with an axial side 111, which faces away from the adjusted bearing assembly 150, of the bracing ring 102. The fixed state is shown in FIG. 3.

As can also be seen from FIGS. 2 and 3, the preload unit 100 has, in this embodiment in the nut element 101, a multiplicity of depressions 120 which are distributed uniformly in a circumferential direction and which are configured to receive a securing element (not shown here) for securing the position of the preload unit 100 relative to the bearing shaft 3.

Figure 4:
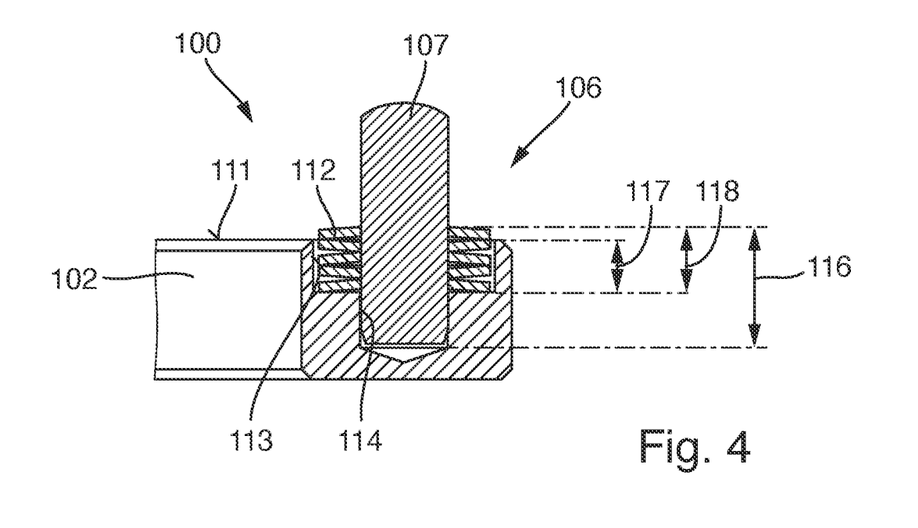
FIGS. 4 and 5 each schematically show a sectional view through the preload unit as per FIGS. 1 to 3 at the level of a spring assembly of the preload unit.
Figure 5:
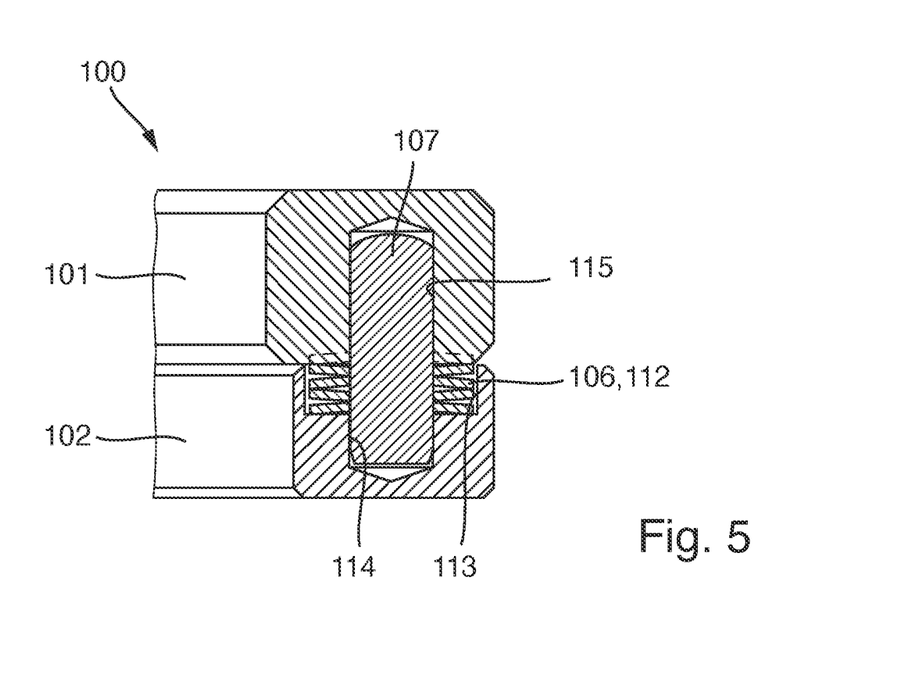

FIGS. 4 and 5 each schematically show a sectional view through the preload unit 100 as per FIGS. 1 to 3 at the level of a spring assembly 106, wherein, in FIG. 3, the preload unit 100 is shown without the nut element 101 in order to be able to better illustrate the functionality of the spring assembly 106. By contrast, in FIG. 5, the preload unit 100 is shown in the fixed state as described above.

As can be seen with regard to FIG. 4, the bracing disc 102 comprises a mating receptacle 114 for receiving the dowel pin 107. In an arrangement concentrically with respect to the mating receptacle 114, the bracing disc 102 comprises a cutout 113 for receiving a spring assembly 106.

The mating receptacle 114 has, in relation to the axial side 111, a depth 116 that is greater than the depth 117 of the cutout 113. The cutout 113 has a diameter that is greater than the diameter of the mating receptacle 114. In other words, the mating receptacle 114 extends physically from a base of the cutout 113 with a residual depth that corresponds to the difference of the depth 116 minus the depth 117.

As can also be seen from FIG. 4, the spring assembly 106 is received in the cutout 113, which spring assembly is illustrated here with its zero length 118, that is to say in an unloaded state. It can be seen that the zero length 118 of the spring assembly 106 is greater than the depth 117 of the cutout 113. In this embodiment, the depth 117 corresponds to a nominal length of the spring assembly 106 associated with a specified spring force that the spring assembly 106 must impart in order to provide the specified preload. The depth 117 is furthermore longer than a block length of the spring assembly 106 that the spring assembly 106 exhibits in a fully compressed state.

Each of the spring assemblies 106 comprises a multiplicity of disc springs 112 stacked one on top of the other in the direction of a direction of action, oriented parallel to the longitudinal axis 2, of the spring assembly 106, which disc springs are threaded onto the dowel pin 107 so as to be lined up in an alternately oriented arrangement.

Alternatively or in addition, it is also possible for at least two of the disc springs 112 to be in an identically oriented arrangement, and/or for at least two disc springs 112 to have different thicknesses and/or different materials.

Alternatively, at least one spring assembly 106 may also have at least one spiral spring, at least one wave spring and/or at least one multi-layer wave spring, and a combination of the stated spring types, for example a combination of disc springs and wave springs.

As can be seen from FIG. 5, the bracing ring 102 likewise comprises receptacles 115 for receiving the dowel pins 107. In this way, the nut element 101 and the bracing ring 102 can be positioned relative to one another in a specified position, in the present case centrally with respect to one another. In particular, by means of the dowel pins 107, the bracing ring 102 is guided relative to the nut element 101 in the direction of the longitudinal axis 2.

Since the zero length 118 of the spring assemblies 106 is greater than the depth 117 of the cutouts 113, the spring assemblies 106 are in a preloaded state when the preload unit 100 is in the fixed state. Correspondingly, the spring assemblies 106 provide a pressure force between nut element 101 and bracing ring 102, which pressure force causes the nut element 101 and bracing ring 102 to move apart when the fixing is released.

Figure 6:
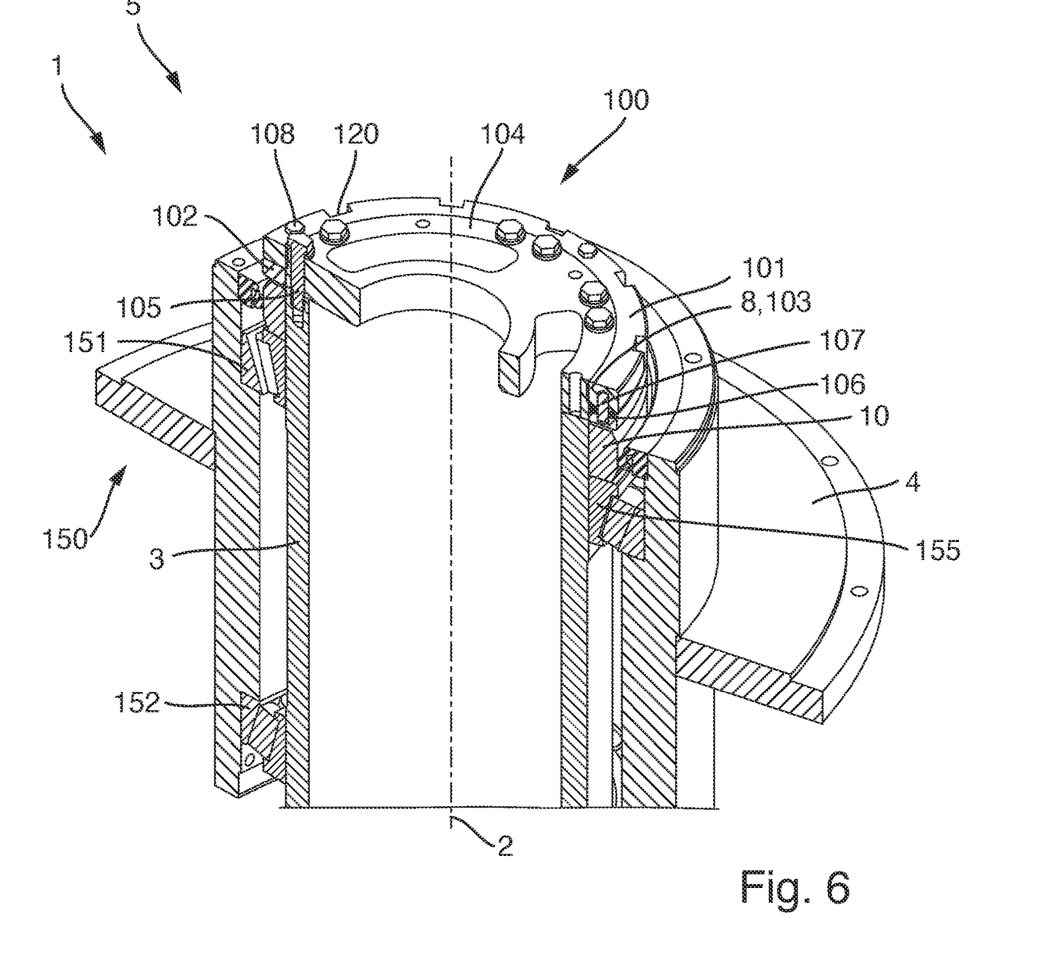
FIG. 6 schematically shows a perspective sectional view through a bearing arrangement of the container processing apparatus from FIG. 1.

FIG. 6 schematically shows a perspective sectional view through the bearing arrangement 1 of the container processing apparatus 5 from FIG. 1, wherein the preload unit 100 is, analogously to its illustration in FIG. 3, in the fixed state and has been applied to the bearing shaft 2 by virtue of the nut element 101 being screwed by way of its threaded portion 103 onto the threaded portion 8 provided by the bracing disc 104.

Figure 7:
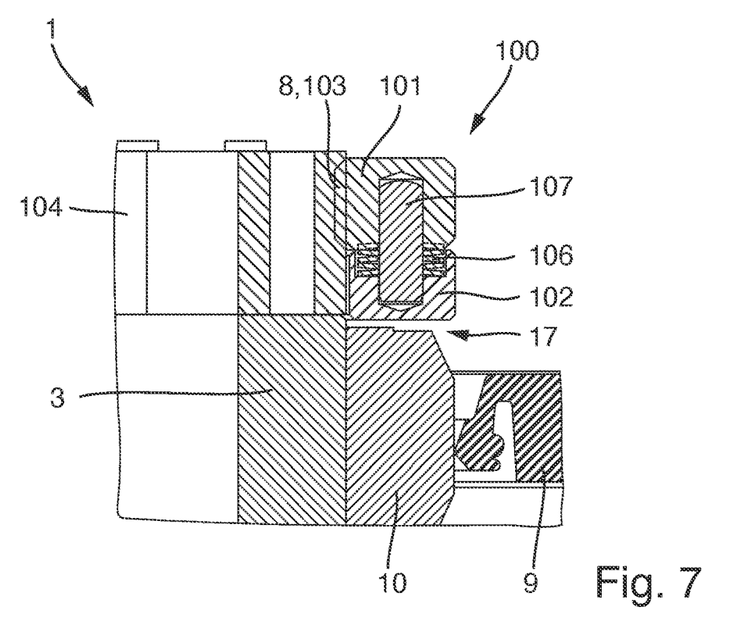
FIG. 7 schematically shows a detail side view of the sectional view from FIG. 6 in the region of a spring assembly.

FIG. 7 schematically shows a detail side view of the sectional view from FIG. 6 in the region of a spring assembly 106. The threaded portion 103 of the nut element 101 is, as described above, already in engagement with the threaded portion 8 of the bracing disc 104 fastened to the bearing shaft 3. However, in the direction of the longitudinal axis 2, there is still a gap 17 between the bracing ring 102 and the rotary ring 10, which is already bearing directly against the inner ring 155 (not shown here).

Figure 8:
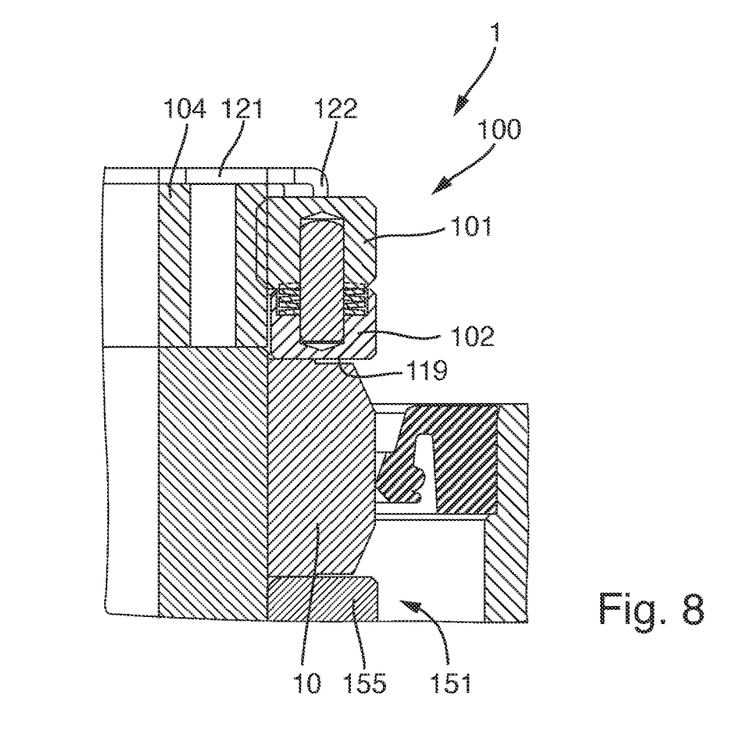
FIG. 8 schematically shows a further view of the detail side view from FIG. 7.

FIG. 8 schematically shows a further view of the detail side view from FIG. 7, wherein the preload unit 100 has, in relation to its position in FIG. 7, been screwed towards the rolling bearing 151 by being rotated about the longitudinal axis 2, owing to the engagement between the threaded portions 8 and 103. As a result, the preload unit 100, more specifically an end side 119, which points in the direction of the rolling bearing 151, of the bracing ring 102, touches the rotary ring 10, which in turn touches the inner ring 155 as viewed in the direction of the longitudinal axis 2. In other words, the preload unit 100 makes contact with the inner ring 155 of the rolling bearing 151 (via the rotary ring 10) as viewed in the direction of the longitudinal axis 2.

Furthermore, a securing element 121 in the form of a securing plate is fastened to the bearing shaft 3, which securing element secures the position of the preload unit 100 by engaging, by way of a securing hook 122, with one of the depressions 120 (see FIGS. 2, 3 and 6). Here, the engagement is such that, as viewed in a circumferential direction, a bidirectional form fit is created between the depression 120 and the securing hook 122. As a result, the nut element 101 that is in engagement with the threaded portion 8 is blocked against rotation about the longitudinal axis 2.

Figure 9:
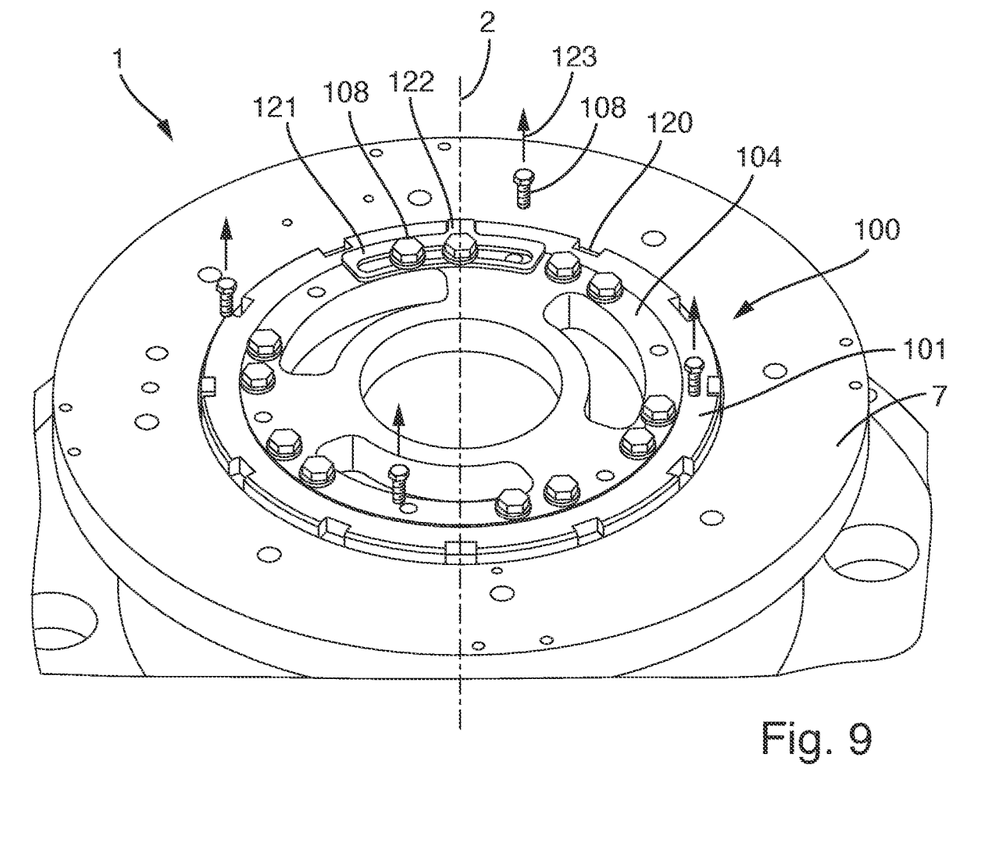
FIG. 9 schematically shows a perspective detail view of a top side of the container processing apparatus from FIG. 6.

FIG. 9 schematically shows a perspective detail view of a top side of the container processing apparatus 5 with mounted container processing carousel 7. The securing element 121, which is in engagement by way of its securing hook 122 with one of the depressions 120, as described above, is in the present case fastened by means of at least one, in the present case two, of the screws 105 to the thread provision part 104 which is configured as a bracing disc, which screws furthermore serve for the fastening of the thread provision part 104 to the bearing shaft 3. It is thus possible for additional parts for the fastening of the securing element 121 to be omitted.

The arrows 123 are used to indicate a process of releasing screws 108, which function as fixing elements for the fixing of the preload unit 100 in the fixed state. By virtue of the screws 108 being released, the bracing ring 102 can be displaced along the dowel pins 107, that is to say in the direction of the longitudinal axis 2, relative to the nut element 101. Since the nut element 101 continues to be firmly held, that is to say fixed, on the bearing shaft 3, the bracing ring 102 is correspondingly pushed in the direction of the bearing assembly 150 by the acting preload of the spring assemblies 106. Owing to the contact between bracing ring 102 and inner ring 155 as described with regard to FIG. 8, the preload provided by the spring assemblies 106 is transmitted directly to the inner ring 155. Accordingly, the bearing assembly 150 is in a specified adjusted state. The level of the preload of the adjusted bearing assembly 150 corresponds here to the spring force provided via the multiplicity of spring assemblies 106, which spring force is made up of the sum total of the above-described spring force when the individual spring assemblies 106 are at approximately the nominal length.

A method for preloading an adjusted bearing assembly 150 of a bearing arrangement 1 for the mounting of a container processing carousel 7 with respect to a base frame 6 of a container processing apparatus 5 in a beverage filling installation will be described below with reference to FIGS. 1 to 9.

Firstly, the preload unit 100 is fixed in the specified fixed state by virtue of the nut element 101 and the bracing ring 102 being screwed together, as shown for example in FIG. 3.

The method furthermore comprises the step of applying the preload unit 100 to the bearing shaft 3. This may be performed for example by virtue of the preload unit 100 being screwed by way of its nut element 100 onto the thread provision part 104 that is already fixed to the bearing shaft 3. Alternatively, it is also possible for a sub-module comprising the thread provision part 104 and the preload unit 100 to firstly be assembled, and for this sub-module to then be mounted onto the bearing shaft 3.

The attachment furthermore optionally comprises screwing the preload unit 100 towards the bearing assembly 150 such that the preload unit 100 is in contact with the inner ring 155 of the adjusted bearing assembly 150 in the direction of the longitudinal axis 2, as shown in FIG. 8 and correspondingly described above.

In an exemplary embodiment, during the application of the preload unit 100 to the bearing shaft 3, tightening of the preload unit 100 is firstly performed until the bearings 151, 152 of the adjusted bearing assembly 150 are in a play-free and in an embodiment braced state, and a release of the bracing action, that is to say a loosening of the preload unit 100, is subsequently performed. It can thus be achieved that the bearings 151, 152 of the bearing assembly 150 and all further components that are involved in the adjustment of the bearing assembly 150, in the present case the rotary rings 10, 12 and the shoulders 13, 14, 15, are in a play-free state with respect to one another, that is to say in contact with one another. It can furthermore thus be achieved that settling has already taken place in the rolling bearings, such that, when the preload is subsequently applied by means of the preload unit 100, no further relative movements are to be expected within the bearings 151, 152.

Subsequently, in order to set the specified preload on the adjusted bearing assembly 150, the preload unit 100 is tightened again until the bracing ring 102 is in play-free contact with the bearing ring 155, which is to be braced, of the adjusted bearing assembly 150. Here, the tightening is performed up to a specified tightening moment, for example into a "hand-tight" state in accordance with the standard EN 1090-2.

For the actual preloading of the adjusted bearing assembly 150 with the specified preload, the fixed state is released by virtue of the screws 108 being released, as described with regard to FIG. 9. As a result, the bracing ring 102 is "released" with respect to the nut element 101, such that said bracing ring is pushed against the inner ring 155 by the spring assemblies 106 supported on the nut ring 101, via which inner ring the preload is transmitted into the bearing assembly 150, and the latter is accordingly in the specified adjusted state.

During a process of assembly of the bearing arrangement 1, it is optionally possible for sub-modules to be preassembled in order to facilitate an assembly process. For example, a first sub-module composed of preload unit 100 and thread provision part 104 may be preassembled, as described above. Alternatively or in addition, a second sub-module composed of bearing shaft 3, rotary ring 12, inner ring 155' and cage 158' together with rolling elements 157' may be created. For example, for an assembly process, there may be inserted into the latter sub-module a third sub-module formed from the bearing cup 4 and the outer rings 156, 156' attached thereto, such that the second rolling bearing 152 is in the assembled state—as shown for example in FIGS. 1 and 6. The cage 158 together with rolling elements 157, the inner ring 155 and the rotary ring 10 may be added, in this sequence, to the resulting module.

Subsequently, the first sub-module may be added, and the preloading of the bearing assembly 150 performed as described above.

Figure 10:
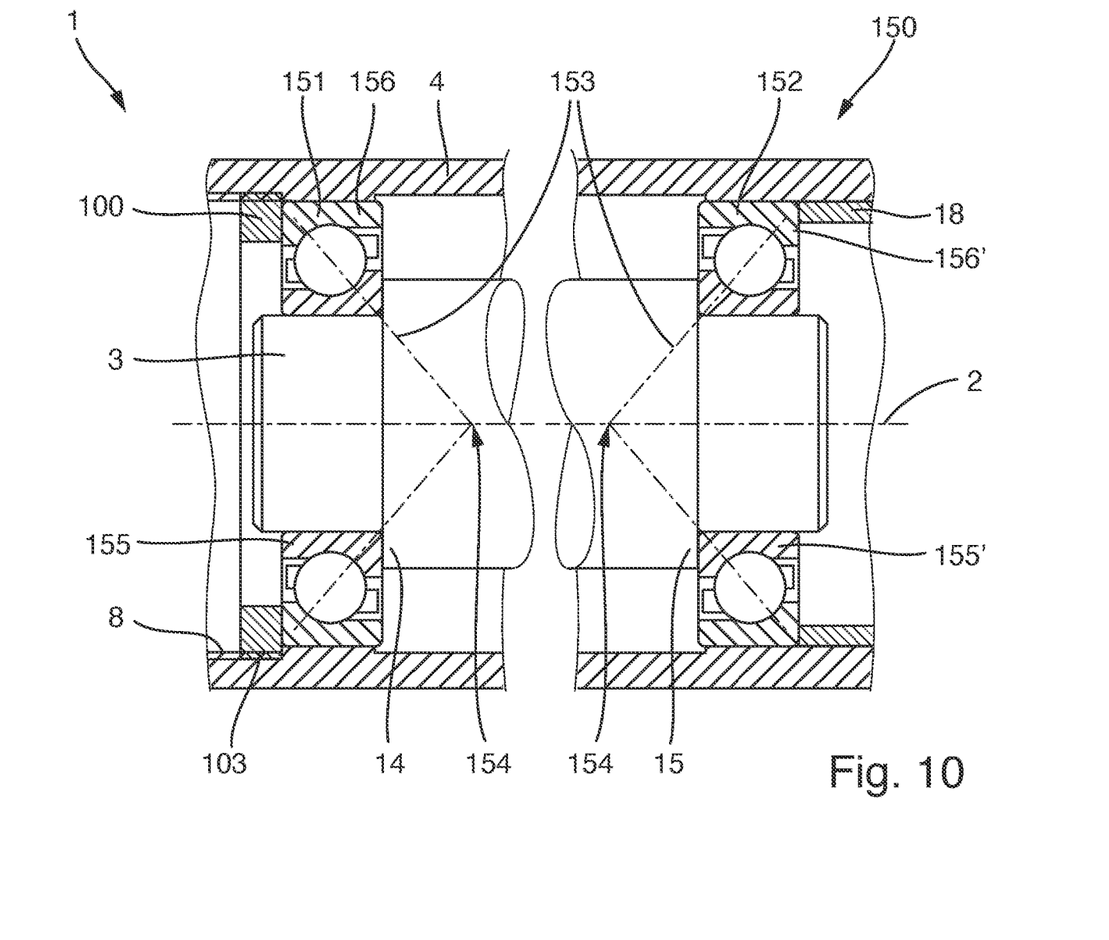
FIG. 10 schematically shows a bearing arrangement according to a further embodiment.

FIG. 10 schematically shows a further embodiment of a bearing arrangement 1, which substantially corresponds to that from FIGS. 1-9. Only the differences in relation to the embodiment as per FIGS. 1-9 will be discussed below.

Here, the bearing assembly 150 has an X arrangement instead of an O arrangement. Accordingly, the pressure cone tips 154 of the rolling bearings 151, 152, which in the present case are configured as angular contact ball bearings, point inwards in relation to the bearing assembly 150.

Owing to the X arrangement, the inner rings 155, 155' are supported in each case at the inside on a shoulder 14, 15 of the bearing shaft 3. The outer ring 156' of the second rolling bearing 152 is supported on a stop 18 that is fixed to the bearing cup 4. Opposite this, the preload unit 100, which is schematically indicated here, is in engagement by way of its threaded portion 108, configured as an external thread, with a threaded portion 8, configured as an internal thread, of the bearing cup 4.

The provision of the adjustment, in other words the setting of the preload of the adjusted bearing assembly 150, is consequently realized in this embodiment by virtue of the preload provided by the spring assemblies 106 (not shown here) being introduced into the outer ring 156.

Where applicable, all individual features presented in the exemplary embodiments may be combined with and/or exchanged for one another without departing from the scope of the invention.

What is claimed is:

1. A bearing arrangement for mounting of a container processing carousel with respect to a base frame of a container processing apparatus in a beverage filling installing, comprising:
a bearing shaft that extends along a longitudinal axis;
a bearing cup that is rotatable relative to the bearing shaft;
an adjusted bearing assembly, arranged between the bearing shaft and the bearing cup, configured to mount the bearing cup with respect to the bearing shaft; and
a ring-shaped preload unit configured to impart a specified preload to the adjusted bearing assembly, wherein:
the ring-shaped preload unit comprises a plurality of spring assemblies that are distributed uniformly in a circumferential direction about the longitudinal axis, and are configured to apply the specified preload to the adjusted bearing assembly,
the ring-shaped preload unit further comprises a nut element and a bracing ring,
the nut element comprises a threaded portion that engages with a correspondingly shaped threaded portion on the bearing shaft or the bearing cup,
the bracing ring is configured to transmit the specified preload to a bearing ring of the adjusted bearing assembly,
the plurality of spring assemblies are arranged between the nut element and the bracing ring,
the threaded portion on the bearing shaft or on the bearing cup comprises a thread provision part that is fixed to the bearing shaft or the bearing cup, and
the thread provision part is fixed to a) an end side or a flange extending in a radial direction of the bearing shaft, or b) an end side or a flange extending in a radial direction of the bearing cup.

2. The bearing arrangement of claim 1, wherein:
a spring assembly from the plurality of spring assemblies comprises a spiral spring, a wave spring, and/or a disc spring, or
a spring assembly from the plurality of spring assemblies comprises a multi-layer wave spring and/or a plurality of disc springs stacked one on top of another in a direction of a direction of action of the spring assembly.

3. The bearing arrangement of claim 1, wherein:
the nut element and/or the bracing ring comprise a plurality of cutouts configured to receive a spring assembly from the plurality of spring assemblies,
one cutout is assigned to one spring assembly, and
the plurality of cutouts have a) a depth greater than a block length of a received spring assembly that the received spring assembly exhibits in a fully compressed state, or
b) a depth that corresponds to a nominal length associated with a specified spring force of the received spring assembly.

4. The bearing arrangement of claim 1, further comprising a positioning element arranged between the nut element and the bracing ring that is configured to position the nut element and the bracing ring relative to one another in a circumferential direction and in a radial direction and/or configured to guide the bracing ring in the direction of the longitudinal axis relative to the nut element, and the positioning element comprises a dowel pin.

5. The bearing arrangement of claim 4, wherein:
the positioning element comprises a plurality of positioning elements,
one positioning element is assigned to one spring assembly,
the one positioning element is, in relation to a central axis of the one spring assembly, arranged centrally with respect to the central axis,
the one spring assembly surrounds the one positioning element in a circumferential direction in relation to the central axis, and
the one positioning element is configured to position the one spring assembly in the direction of the longitudinal axis.

6. The bearing arrangement of claim 1, wherein:
the ring-shaped preload unit further comprises a fixing element configured to fix the nut element and the bracing ring with respect to one another, and
in a specified fixed state, an axial side, facing towards the adjusted bearing assembly, of the nut element is in contact with an axial side, facing away from the adjusted bearing assembly, of the bracing ring.

7. The bearing arrangement of claim 1, wherein:
the threaded portion of the nut element is configured as an internal thread and engages with the threaded portion of the bearing shaft that is formed on the bearing shaft as an external thread,
the adjusted bearing assembly has an O arrangement, and
the ring-shaped preload unit applies the specified preload to an inner ring of the adjusted bearing assembly via the bracing ring.

8. The bearing arrangement of claim 1, wherein:
the threaded portion of the nut element is configured as an external thread and engages with the threaded portion of the bearing cup that is formed on the bearing cup as an internal thread,
the adjusted bearing assembly has an X arrangement, and
the ring-shaped preload unit applies the specified preload to an outer ring of the adjusted bearing assembly via the bracing ring.

9. The bearing arrangement of claim 1, wherein the ring-shaped preload unit comprises a securing element configured to secure the ring-shaped preload unit relative to the bearing shaft or relative to the bearing cup.

10. The bearing arrangement of claim 9, wherein:
the securing element is configured to secure the nut element against rotation about the longitudinal axis relative to the bearing shaft or relative to the bearing cup,
the securing element is configured in a form of a securing plate,
the securing element is fixable to the bearing shaft or to the bearing cup, and
the nut element is secured against rotation via fixing of the securing element.

11. The bearing arrangement of claim 1, wherein:
the adjusted bearing assembly comprises two rolling bearings that are arranged with a specified spacing to one another as viewed along the longitudinal axis,
each rolling bearing comprises an inner ring, an outer ring, and a plurality of rolling elements arranged between the inner ring and the outer ring; and
one rolling bearing is configured as a ball bearing or a roller bearing.

12. The bearing arrangement of claim 11, wherein:
the one rolling bearing is configured as a roller bearing,
the roller bearing comprises a cylindrical-roller bearing or a tapered-roller bearing, and
the roller bearing is configured as an angular contact bearing.

13. A container processing apparatus for a beverage installation, comprising:
a base frame;
a container processing carousel that is rotatable about a central axis of rotation relative to the base frame; and
a bearing arrangement arranged between the base frame and the container processing carousel, the bearing arrangement configured to mount the container processing carousel on the base frame, wherein the bearing arrangement comprises:
a bearing shaft that extends along a longitudinal axis;
a bearing cup that is rotatable relative to the bearing shaft;
an adjusted bearing assembly, arranged between the bearing shaft and the bearing cup, configured to mount the bearing cup with respect to the bearing shaft; and
a ring-shaped preload unit configured to impart a specified preload to the adjusted bearing assembly, wherein:
the ring-shaped preload unit comprises a plurality of spring assemblies that are distributed uniformly in a circumferential direction about the longitudinal axis, and are configured to apply the specified preload to the adjusted bearing assembly,
the ring-shaped preload unit further comprises a nut element and a bracing ring,
the nut element comprises a threaded portion that engages with a correspondingly shaped threaded portion on the bearing shaft or the bearing cup,
the bracing ring is configured to transmit the specified preload to a bearing ring of the adjusted bearing assembly,
the plurality of spring assemblies are arranged between the nut element and the bracing ring,
the threaded portion on the bearing shaft or on the bearing cup comprises a thread provision part that is fixed to the bearing shaft or the bearing cup, and
the thread provision part is fixed to a) an end side or a flange extending in a radial direction of the bearing shaft, or b) an end side or a flange extending in a radial direction of the bearing cup.

14. A method for preloading a bearing arrangement of a container processing apparatus as set forth in claim 13, comprising:
fixing the ring-shaped preload unit in a specified fixed state;
applying the ring-shaped preload unit to the bearing shaft or the bearing cup such that the ring-shaped preload unit is in contact with the bearing ring of the adjusted bearing assembly in the direction of the longitudinal axis;
securing a position of the ring-shaped preload unit on the bearing shaft or the bearing cup; and
releasing the specified fixed state.

15. The method of claim 14, wherein:
applying the ring-shaped preload unit to the bearing shaft or the bearing cup comprises screwing the ring-shaped preload unit onto the bearing shaft or onto the bearing cup, and
securing the position of the ring-shaped preload unit comprises securing of the ring-shaped preload unit against rotation relative to the bearing shaft when the ring-shaped preload unit has been screwed onto the bearing shaft, or
securing the position of the ring-shaped preload unit comprises securing of the ring-shaped preload unit against rotation relative to the bearing cup when the ring-shaped preload unit has been screwed onto the bearing cup.

16. The method of claim 14, wherein applying the ring-shaped preload unit to the bearing shaft or the bearing cup comprises:
tightening the ring-shaped preload unit until bearings of the adjusted bearing assembly are in a play-free state and a braced state,
subsequently loosening the ring-shaped preload unit, and
retightening the ring-shaped preload unit to set the specified preload on the adjusted bearing assembly.

17. The method of claim 16, wherein:
retightening the ring-shaped preload unit comprises tightening the nut element of the ring-shaped preload unit until a bracing ring of the ring-shaped preload unit is in play-free contact with the bearing ring that is to be braced of the adjusted bearing assembly, and wherein the nut element is tightened with a specified tightening moment, and/or loosening the ring-shaped preload unit comprises releasing a fixing element configured to fix the nut element and the bracing ring with respect to one another in the specified fixed state.

\* \* \* \* \*